United States Patent [19]

Lynnworth

[11] 3,906,791

[45] Sept. 23, 1975

[54] AREA AVERAGING ULTRASONIC FLOWMETERS

[75] Inventor: Lawrence C. Lynnworth, Waltham, Mass.

[73] Assignee: Panametrics, Inc., Waltham, Mass.

[22] Filed: Oct. 1, 1973

[21] Appl. No.: 402,363

[52] U.S. Cl. ............................................. 73/194 A
[51] Int. Cl.² ......................................... G01F 1/66
[58] Field of Search ................................. 73/194 A

[56] References Cited
UNITED STATES PATENTS

| | | | |
|---|---|---|---|
| 2,746,291 | 5/1956 | Swengel | 73/194 A |
| 2,755,662 | 7/1956 | Swengel | 73/54 X |
| 2,874,568 | 2/1959 | Petermann | 73/194 A |
| 2,959,054 | 11/1960 | Welkowitz | 73/194 A UX |
| 3,050,997 | 8/1962 | Lake | 73/194 A |
| 3,553,636 | 1/1971 | Baird | 73/54 X |
| 3,575,050 | 4/1971 | Lynnworth | 73/194 A |
| 3,731,532 | 5/1973 | Courty | 73/194 A |
| 3,788,140 | 1/1974 | Turtle | 73/194 A |

*Primary Examiner*—Charles A. Ruehl
*Attorney, Agent, or Firm*—Kenway & Jenney

[57] ABSTRACT

A flowmetering cell for ultrasonically measuring the area-averaged flow velocity of fluids, independent of whether the flow profile is laminar, transitional, turbulent or irregular. The cell contains non-intrusive transducers which, when electronically energized, generate a square or rectangular ultrasonic beam to obliquely and bidirectionally interrogate all fluid flowing through a region defined by a square or rectangular flow channel within the cell.

22 Claims, 20 Drawing Figures

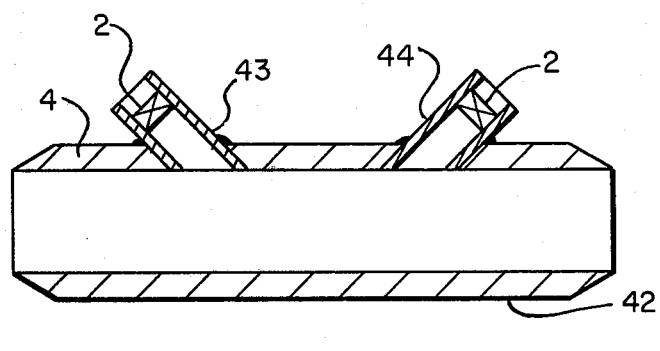
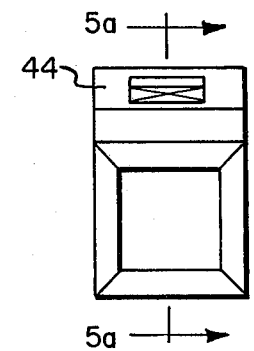
FIG.5a          FIG.5
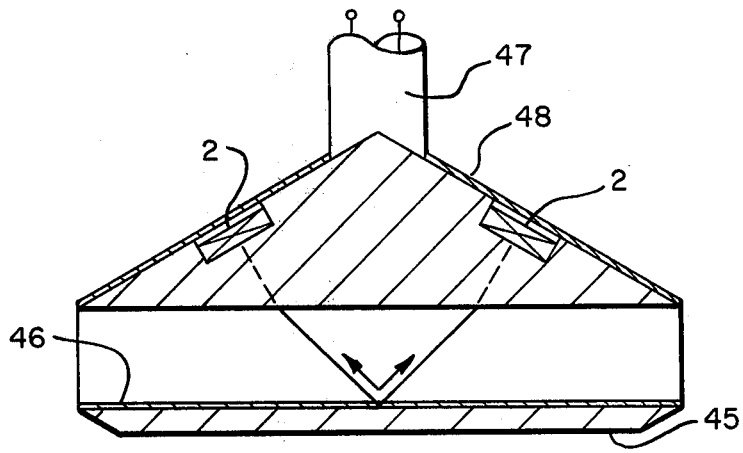
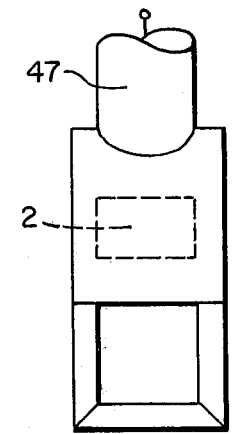
FIG. 6a         FIG. 6
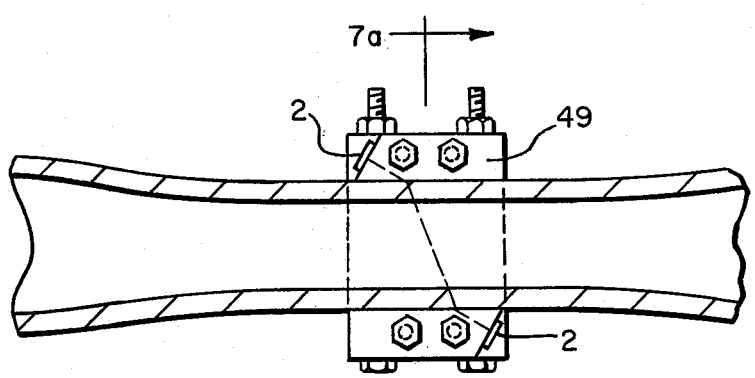
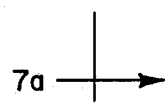
FIG. 7          FIG.7a

AREA AVERAGING ULTRASONIC FLOWMETERS

FIELD OF THE INVENTION

This invention relates in general to ultrasonic flowmeters and more particularly to area average measurement of fluid flow through conduits.

BACKGROUND OF THE INVENTION

In the measurement of the fluid velocity flow rates where the fluids are confined within a conduit, one nonintrusive technique which has proved successful in a number of applications is the use of transducers to generate ultrasonic waves which are transmitted diagonally across the conduit, such that a significant component of the ultrasonic beam is transmitted in the direction parallel to the direction of flow of the fluid through the conduit. The ultrasonic waves generated may be either longitudinal waves or shear waves, with the latter type being converted by refraction at a solid fluid interface into longitudinal waves. The measurement of the flow velocity is made, usually, by determining the difference in transit time between a longitudinal wave traveling diagonally downstream and one traveling diagonally upstream. The measurements may be made with waves traveling different paths or over a common path. Also, the transit measurements may be made sequentially on upstream and downstream transits or, by employment of pairs of transducers, they may be made simultaneously. The determination of transit time in this fashion may be accomplished by clocking the time difference between two video pulses or alternatively by measuring the phase shift between emitted continuous waves or bursts of continuous waves. Another technique for flow velocity measurement utilizes using these ultrasonic beams measurement of doppler frequency shifts of scattered waves. By making additional measurements or determinations of the fluid characteristics for transmission of sound velocity and density, the readout may be provided not only in terms of the linear flow velocity or the volumetric flow rate, but also in terms of the mass flow rate. A number of specific geometric configurations and techniques for measurement utilizing ultrasonic techniques are described in U.S. Pat. No. 3,575,050 issued on Apr. 13, 1971.

In situations where it is required to nonintrusively measure the velocity of flow of fluids in conduits, the specific measurement conditions may vary rather widely. For example, the area over which measurements are to be made may vary from one square millimeter to one square meter, the time during which a measurement is to be made may vary from a millisecond to one minute or even longer. The precision or accuracy requirements are usually within one percent and may be as low as one tenth of a percent. The variation in flow velocity encountered also extends over a wide range from substantially zero velocity at the walls of the conduit to speeds approaching or equal to the speed of sound.

In the flow of fluids in closed conduits, it is clear that the flow velocity will vary across the area of the fluid, usually being lowest near the walls of the conduit and increasing to a maximum velocity somewhere near the center. The flow profile of these flow velocities will vary widely from case to case. Interrogation of the flowing fluid with an ultrasonic wave that averages over the diameter of the conduit but not over the whole area of the conduit, provides a measurement of velocity $v_d$ equal to $v_a/K$, where $v_d$ is the diameter averaged flow velocity, $v_a$ is the area averaged flow velocity and K is a constant which is less than unity, the actual value of which depends upon the Reynolds number Re. The Reynolds number expresses the ratio of inertial to viscous forces. Numerically, this dimensionless ratio is given by the expression $Re = \rho v d/\eta$ where $\rho$ is fluid density, V is free stream flow velocity, D is channel width or diameter, and $\eta$ is viscosity coefficient. For laminar flow, where the Reynolds number is typically less than two thousand, the profile across the diameter is theoretically parabolic in a smooth regular circular pipe. Under these conditions an ultrasonic flow measurement over the diameter provides a value for flow velocity $v_d$ which is larger than the true area average value $v_a$ by 33%. Accordingly, where the specific flow profile through the conduit is known, the values of the coefficient K may be utilized to express a measurement of velocity across the diameter in terms of the average area velocity. However, in a number of circumstances, the flow profile is at best uncertain due to the proximity of perturbations or irregularities within the conduit and, thus, the reliability of the output indication, in terms of average area velocity, can deteriorate rapidly. Even in those circumstances where the fluid type is known, the value of K may not be known because it depends upon the value of Reynolds number Re which can itself vary over wide temperature ranges. In order to obtain sufficient accuracy of ultrasonic measurements under these conditions, one approach has been a multipath measurement such as the 4-chord Gaussian quadrature method. Other approaches have been to employ an offset configuration, which in practice suffers from profile-dependency errors and also introduces some disruption of the flow lines.

SUMMARY OF THE INVENTION

Broadly speaking, in the present invention the correct weighting of the flow profile in the measurement of flow velocity across a conduit is accomplished by flowing the material through a section of conduit having a rectilinear cross section in a plane transverse to the direction of flow and interrogating the fluid with a substantially plane ultrasonic beam, itself having a rectilinear cross section, with the beam dimension and the conduit dimension along one coordinate being equal and with the beam dimension in the other direction along the other coordinate being equal to or less than the conduit dimension along the same coordinate. The measurements are preferably made in a path length of fluid within the very near field of the transducer generating the ultrasonic beam so that the curvature of the interrogating wave by the flow of the fluid is minimized. In general, the path length of the ultrasonic beam in the flowing fluid should not exceed $d^2/\lambda$ where $d$ is the smaller dimension of the interrogating beam and $\lambda$ is the wave length in the fluid. Thus, in a typical situation where $\lambda = 1$ mm, if the diameter, $d$, equals 10 mm, then the path length should be approximately 100 mm long. For the best operating conditions, the path length should not exceed one quarter of this distance, i.e. $\leq$ 25 mm long. In many situations, the rectilinear conduit, which may be either square or rectangular, is a flow cell introduced into the flow path. The flow cell, then, is an entire apparatus including ultrasonic transducers mounted to produce the appropriate interrogating ultrasonic beams. These beams which bidirectionally interrogate the fluid in response to transducer energization may be given their rectilinear shape in any one of several ways. For example, piezoelectric generators and detectors may be ground to the desired shape or, alternatively, a circular disk may be employed with at least one of its surfaces electroded in a rectilinear pattern. Yet another approach is to collimate generated beams of any shape by means of opposed cavities or slots having rectilinear cross sections.

By employing beams of rectilinear shape to interrogate the fluid in conduits of matched shape, all of the segments betweens the ceiling and the floor of the flow channel may be measured and correct area averaging may be provided.

DESCRIPTION OF THE DRAWING

FIG. 1c is a cross sectional view taken along the line cc of FIG. 1a;

FIG. 5 is an illustration of an end view of a flowmeter cell constructed in accordance with the principles of this invention.

FIG. 5a is a cross sectional view of the flowmeter cell of FIG. 5 taken along the line aa of FIG. 5;

FIG. 6 is an end view of another embodiment of a flowmeter cell constructed in accordance with the principles of this invention;

FIG. 6a is a cross sectional view of the flowmeter of FIG. 6 taken along the line aa;

FIG. 7 is an illustration in cross sectional view of an ultrasonic probe apparatus constructed in accordance with the principles of this invention;

FIG. 7a is an illustration of the probe of FIG. 7 taken along the line aa of FIG. 7;

DESCRIPTION OF PREFERRED EMBODIMENTS

Figure 1A:
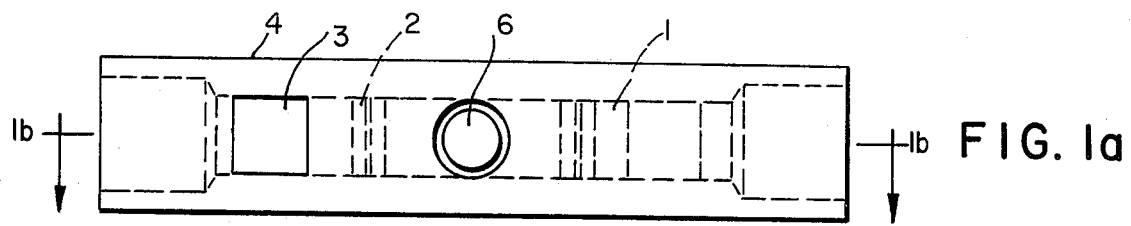
FIG. 1a is an illustration in plane view of a flowmeter cell constructed in accordance with the principles of this invention.
Figure 1B:
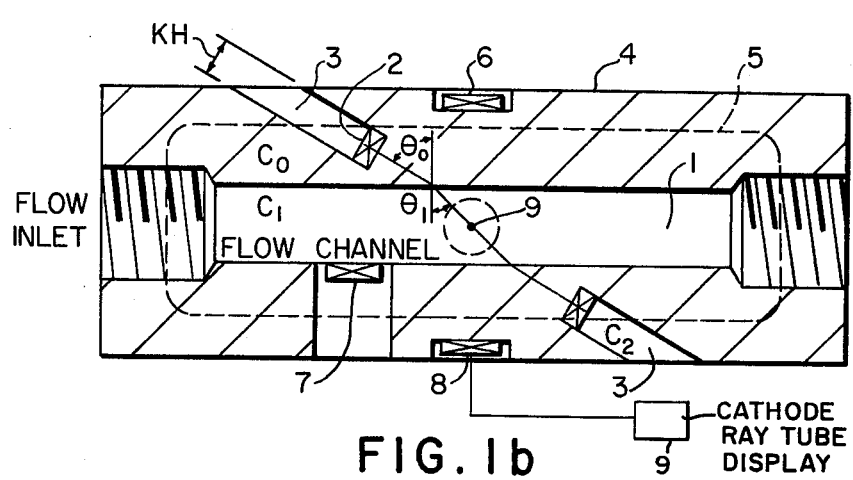
FIG. 1b is a cross sectional view along the line bb of FIG. 1.
Figure 1C:
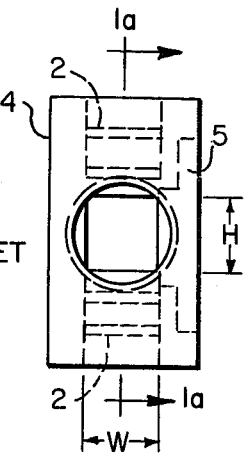

With reference to FIGS. 1a, 1b and 1c there is shown an embodiment of an ultrasonic flowmeter cell. The cell body A is formed out of a suitable material, such as stainless steel or aluminum. Other suitable materials include plastic, glass or many other solids. The cell contains an axial flow channel or conduit with a rectilinear cross section having a width dimension W and a height dimension H. The conduit 1 typically has a length two to ten times longer than the larger dimension of its cross section. The inlets and outlets to the flow channel 1 are shown in FIG. 1 as threaded for connection to the line through which the fluid to be measured is flowing. Tapered fittings or flanged connections may be substituted for the threaded inlets and outlets shown.

A pair of ultrasonic transducers 2 are positioned within a pair of recesses 3, with the recesses extending in a direction oblique to the axis of flow in the conduit 1. The transducers 2, generate a beam of ultrasonic waves which is characterized by a rectilinear cross section in the plane normal to the axis of propagation of the beam. The cross section of the beam has a dimension W by kH where $k$ has a value typically between 0.5 and 1.0. The axes of the recesses 3 are parallel to one another. The transducers 2 are arranged to launch an oblique wave in the cell body material at an angle $\theta_0$ with respect to the normal drawn to the axis of the conduit 1. Transducers 2 may be any conventional ultrasonic transducers such as electroded piezoelectric material. The oblique waves transmitted through the cell body at angle $\theta_0$ interrogate the fluid flowing through conduit (one) 1 at an angle $\theta_1$, where the angles $\theta_0$ and $\theta_1$ are related to the sound speeds $c_0$ and $c_1$ in the solid fluid, respectively in accordance with Snell's Law which states that, $c_0/\sin \theta_0 = c_1/\sin \theta_0$. The position of transducer 2 with respect to conduit 1 will depend, therefore, on the angles $\theta_0$ and $\theta_1$ and also on the number of times the ultrasonic beam is to transverse the fluid path. Thus, while in FIG. 1 the beam is indicated as having a single traverse of the fluid path, by arranging for the greater separation between the two transducers along the axis of flow, a multiple traverse may be utilized.

The conductor within the cell 4 may be formed by being broached or electric-discharge-machined between the inlet and outlet ports. Alternatively the conduit may be milled out and the cover plate 5 (as shown in dotted lines in FIG. 1) may then be attached. The cover plate 5 may be either permanently attached, such as by welding, or may be removably attached, for example by screws or clamps. The cover plate 5 maybe formed of a transparent material such as a clear plastic so that the flow pattern and clogging or buildup of residual materials may be visually observed without the distortion of a curved lens.

The orthogonal walls of the conduit 1 enable other nonintrusive ultrasonic measurements on either a pulse-echo or through-transmission mode to be made. These measurements may include time interval measurements across the fluid perpendicular to the direction of flow to determine the acoustic speed, $c_1$ of the fluid. Additionally, the reflection coefficient of one of the walls may be measured in order to obtain $\rho c_1$ which then allows for determination of the fluid density, $\rho$. The attenuation coefficient, $\alpha$, of the fluid may also be measured to provide in some instances information on fluid viscosity.

In FIG. 1 transducer assemblies 6, 7 and 8 are conventional ultrasonic transducers which are positioned to perform density, sound speed and attenuation measurements. The attenuation may, for example, be measured by visual observation of the amplitude of the signal generated at transducer 8 by the incoming ultrasonic beam. This amplitude may conveniently be displayed on a conventional cathode ray tube display 9. In FIG. 1 the transducers are illustrated as being in the same plane as the velocity measuring transducers 2. These additional transducers may, however, be located in an orthogonal plane or planes, so that the beams interrogate the same volume element of fluid at the same time that the flow velocity of that element is being interrogated. The axis of such a composite assembly would ideally intersect the flow channel 1 axis and the flow interrogation beam axis at a point 9 illustrated in FIG. 1.

Figure 2:
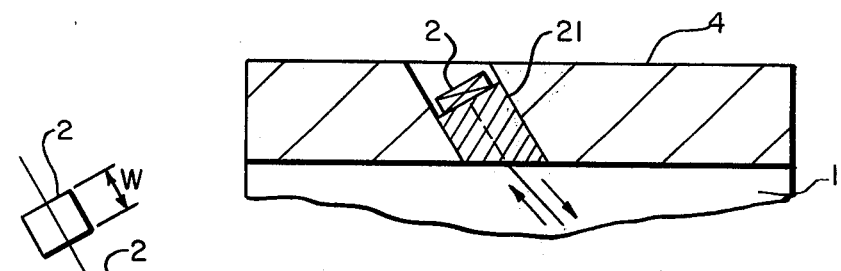
FIGS. 2, 3 and 4 are illustrations in cross sectional view of portions of alternative embodiments of flowmeter cells constructed in accordance with the principles of this invention.

Turning now to FIG. 2, an alternative arrangement for positioning of one of the transducers assemblies 2 is illustrated. In FIG. 2 as in most of FIGS. 2 through 9, only one-half of the measurement cell is shown, since in those instances the other one of the pair of transducers is identical. In the configuration of FIG. 2 a plug 21 is inserted within the recess 3 between the transducer 2 and the fluid within the conduit 1. The plug 21 is formed of materials which will provide preferred acoustic properties such as sound speed, density and attenuation coefficient in the cell measuring region where it is undersirable to form the entire cell body 4 of a material having these specific properties. Additional materials which may be employed for this purpose include graphite, various alloys, and plastic such as polytetrafluoroethylene. In a specific example, the insert 21 is formed of acrylic plastic in which the shear wave sound speed is about 1 mm/$\mu$s, and if the fluid is water, then $c_1$ equals 0.5 mm/$\mu$s. If transducer 2 generates a shear wave at an incident angle where $\theta_0 = 30°$, the longitudinal wave in the water will propagate at a refracted angle $\theta_1$ of ~ 45°.

Figure 3:
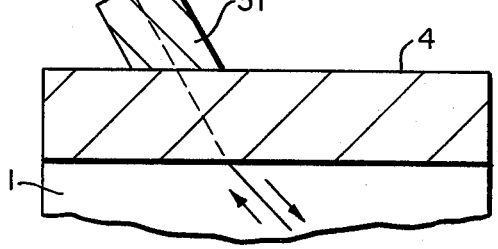

In FIG. 3, the transducer 2 is mounted on a wedge 31 which is coupled to the outside surface of the cell body 4. This provides a technique for generating the oblique wave without the requirement of recessing the body of the cavity.

Figure 4A:
FIG. 4a shows a specific transducer arrangement.
Figure 4:
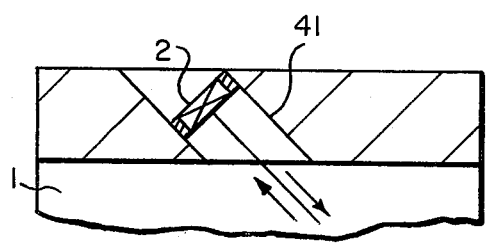

In FIG. 4 a transducer assembly is illustrated in which transducer 2 is mounted within a transducer cavity 41 which extends at an oblique angle entirely through the wall of the cell 4. In this configuration the angle of incidence of a produced beam does not depend upon the ratio $c_0$ and $c_1$ since the transducer is coupled to the fluid itself. As shown in FIG. 4a, in a specific example of an arrangement for a transducer in accordance with FIG. 4, the transducer element was a piezoelectric material 17 of circular shape, 19 mm in diameter electroded by a rectangular electrode 18 of area of 12.7 mm by 6.35 mm. The transducer assembly was sealed into the cavity 41 by means of an "O" ring. In the specific example above, the rectilinear dimension of the conduit 1 were W=H= 12.7 mm.

In FIGS. 5 and 5a there is illustrated a slightly modified version of FIG. 4, in which the W by H flow channel 1 is defined by a first square or rectangular pipe 42, and the transducer channels are defined by a pair of square or rectangular pipes 43 and 44 which may be welded, brazed or epoxied at the required positions and angles, e.g., 45°. For illustrative purposes, FIG. 5A shows both transducer channels or ports on the same side of the flow channel pipe, for a double traverse. Obviously they may be on opposite sides, as in generally intended in the other FIGS. 1–12. A cell assembled as in FIG. 5 and 5a may be useful in some instances as a probe which accurately senses, with little perturbation of the total initial profile of a large pipe or duct, all the fluid entering its inlet. By mounting this probe such that its flow axis is at a suitable point such as on-axis, or off-axis at radius $r$, where $v(r) \approx v_a$ for the Reynolds number range of interest, a useful indication of flow may be achieved. On the other hand, either by scanning radially with one probe, or by averaging the readings obtained with a number of small probes, a measure of flow velocity may be obtained in a duct or pipe which is so large that it cannot be easily interrogated nonintrusively over 100% of the total flow channel area, especially where the large channel cannot be square or rectangular.

In the type of application shown in FIGS. 5 and 5a, while the transducers are nonintrusive with respect to the small flow channel, the exterior shape and dimensions of the probe must be designed to minimize drag and more generally to minimize the pressure drop and other perturbations introduced by a small probe in a large conduit. In view of the fact that the obstructive cross section of the inlet portion of the probe can be made quite small and streamlined, and because disturbances on the outside of the probe, downstream of the inlet, do not perturb the flow measurement, and because the orthogonal-walled W by H flow channel is itself unobstructed, this type of probe may be particularly useful in profiling and survey measurements in fluids of much larger cross section than the probe.

Another form of a probe-type cell is shown in FIGS. 6 and 6a. The major portion of the cell body 45 may be plastic, e.g., acrylic, for use with water. To increase the reflectivity of the inner surface at megahertz ultrasonic frequencies, a thin layer of higher density material 46 such as 0.1 mm thick stainless steel may be bonded to the wall opposite the transducers. The two transducers interrogate the fluid at 45°, the angle of refraction of shear waves incident from the plastic at 30°. The transducers may be electrically shielded by surrounding the outer surface of the probe with additional 0.1 mm thick stainless steel, 48, grounded electrically to the electromechanical connector shield 47. This shield 47 may be a solid (inflexible) metal tube, which contains the two transducer "high" leads, and which can be used to orient the probe by rotation about its axis, to measure, for example, swirl or cross flow components, as well as axial flow velocity in a large conduit.

A functionally equivalent construction may be built by making the major portion of the cell in FIG. 6 out of metal or ceramic, and by inserting acrylic or other low-sound-speed buffers as in the embodiment 21 of FIG. 2.

A clamp-on flowmeter probe is shown in FIGS. 7 and 7a appropriate to some pipes which are generally of circular cross section, but which are flexible or malleable enough so that they can be mechanically deformed by orthogonal pairs of parallel clamps 49. In the region of measurement, the originally circular pipe is constrained externally so that an essentially square or rectangular flow channel is provided. Transducers may be coupled directly to an opposing pair of flattened pipe walls, or they may be coupled or attached to one of the clamps, such that the ultrasonic beams are subsequently pressure-coupled or otherwise conventionally coupled to the opposite walls. If a circular pipe of inside radius R is deformed to a square, the length of the interior side S of the resulting square is readily calculated by equating interior "perimeters". Thus, setting $2\pi R = 4s$, then $S = \pi R/2$. This determines the required transducer or beam width, previously denoted W, as in FIG. 1, in terms of the round pipe's interior dimension. As a numerical example, if $R = 10$ mm, $S = W = 15.9$ mm. In other words, S is approximately 60% greater than R, or in terms of the original inside diameter 2R, S is approximately 20% less than the original inside diameter.

The combination of clamps and transducers shown in FIGS. 7 and 7a may also be applied to originally square or rectangular thin-walled pipe, to help maintain orthogonal flat walls despite high internal fluid pressures, which tend to bow the sides of unrestrained pipe that is not sufficiently stiff by itself.

Comparing the areas $A_0$ and $A_{SQ}$ of the circular and square regions, respectively, it is seen that:
$A_0 = \pi R^2$; $A_{SQ} = S^2 = (\pi R/2)^2$; $A_0/A_{SQ} = 4/\pi \approx 1.27$.
Therefore the average flow velocity $v_0$ in the circular region will increase by 27% to 1.27 $v_0$ in the square region, if the fluid is incompressible. The mass flow rate, however, is the same in both regions, for any fluid confined to the conduit, whether or not the fluid is compressible for steady-state flow.

Figure 8:
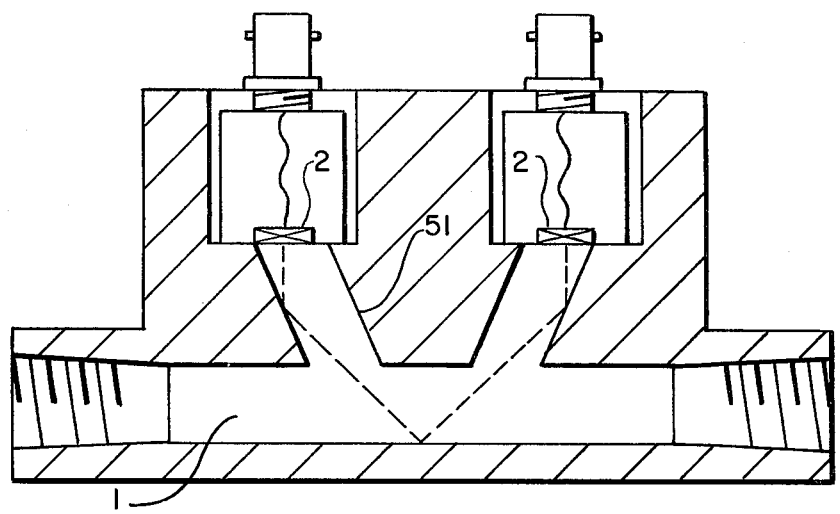
FIG. 8 is an illustration in cross sectional view of another configuration of a flowmeter cell constructed in accordance with the principles of this invention.

In FIG. 8 a cavity 51 inclined at 22.5° to the normal to the flow channel axis, reflects the incident longitudinal wave beam to interrogate the fluid at 45°.

Figure 9:
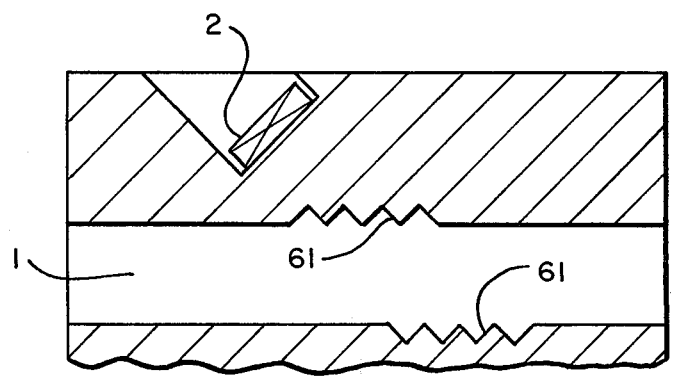
FIG. 9 and FIG. 10 are illustrations in a cross sectional view of additional embodiments of flowmeters constructed in accordance with the principles of this invention.

In FIG. 9 the internal surface of the conduit 1 is subdivided into vee-grooves 61 in the regions between the transducers 2 and the fluid. This maintains propagation along a specific oblique path, and yet reduces the amount of material that must be removed near the intersection of the transducer cavity and the flow channel. Another purpose of the vee grooves is to reduce the scale of turbulence, and to provide supports for membranes, screens of acoustic windows used as flow smoothers, as described in connection with FIGS. 11 and 12.

Figure 10:
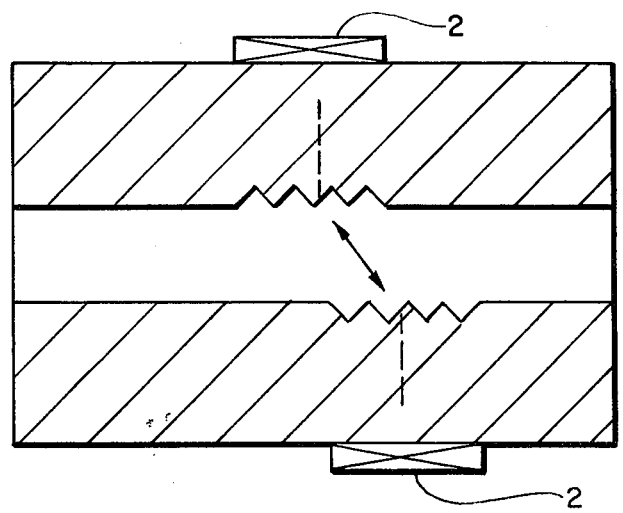

FIG. 10 differs from FIG. 9 in that the transducer launches a wave normal to the flow axis. But this wave, after impinging on the vee grooves 61 is refracted obliquely across the fluid. When the ratio $c_0/c_1$ is large, as it is for metal/air interfaces, the oblique angle is relatively insensitive to changes in $c_0$ and $c_1$, propagation being in a direction in air nearly normal to the vee surfaces, that is, at nearly 45° in the air. However, in FIGS. 9 and 10, care must be exercised so that diffraction effects do not confuse the measurement.

Figure 11:
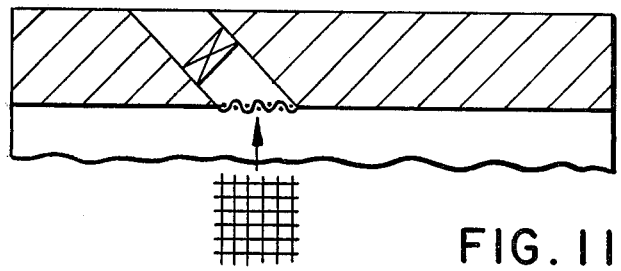
FIGS. 11 and 12 are illustrations in a cross sectional view of portions of flowmeters cells constructed in accordance with the principles of this invention, illustrating specific details thereof.
Figure 12:
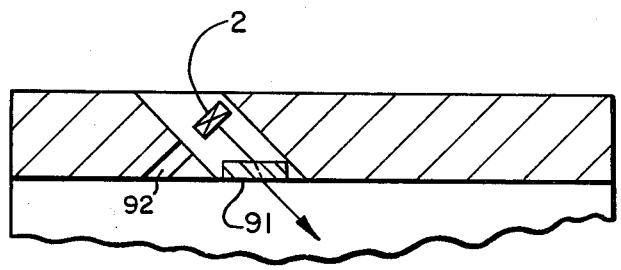

FIGS. 11 and 12 illustrate two ways of reducing the undesirable effects of eddies, which are generated at high flow velocities. Since these eddies are not symmetrically confined to the region interrogated by the beam, their effects are not perfectly cancelled by upstream and downstream interrogations, and so they produce nonlinear response. The degree of nonlinearity depends on the size and nature of the eddy compared to H. For example, small eddies will not produce departures from linearity greater than 1%, when H is sufficiently large. However, when circumstances require that interrogation be at a particular angle, and that the transducer cavity diameter be comparable to H, and if Re ranges from ~ 100 to ~ 100,000, then it is preferable to provide a means of damping or eliminating these eddies. This means should also provide a high transmission coefficient for ultrasonic energy, e.g., at least 50%, and often $\geq$ 90%. In FIG. 11 a wire cloth, or a screen mesh, 81, is used to dampen the eddies, and yet provide a high transmission coefficient. The wire cloth 81 is positioned essentially in the planes of the side walls of the W by H flow channel 1, i.e., a distance H apart. The wire cloth, typically made of stainless steel, may be silver brazed or epoxied in a small recess machined in the side wall, or it may be joined to an insertable transducer assembly. A suitable mesh size for use from 18 1 to 5 MHz with common liquids, c ~ 1000 m/s, $\eta <$ 100 centipoise, would have a mesh opening of about 1 mm, defined by wires of diameter about 0.10 to 0.25 mm. Finer meshes are preferred, provided that they do not clog, that they are strong enough, and that they do not introduce serious diffraction effects. The spaces in the wire cloth encourage thermal and compositional equilibrium to be maintained between the cavity and the flow channel. This assures that the sound beam propagates without refractive bending on passing through the screen.

The arrangement shown in FIG. 12 illustrates an alternative to the embodiment of FIG. 11, in that, instead of the screen, a membrane or plate 91 is used as an acoustic window. For operation essentially at a single frequency, and at a single temperature, the member 91 may be fabricated or tuned to resonance, even it its characteristic impedance is substantially different from that of the fluid (e.g., steel/water, impedance ratio $\approx$ 30:1). However, for interrogation of most liquids near 45° it can be shown that the choice of plate-like window materials like plastics or graphites, which because of inherent attenuation, are not particularly efficient as resonated devices. Thus, the thickness of member 91 is generally chosen based on mechanical and transmission coefficient requirements, not resonance requirements. A typical thickness would be ~ 1 mm. For some cases the use of plastics or graphites is undesirable, but metal is allowable, sometimes as thin as 0.01 mm.

When the fluid is air or other low-density gas, a membrane can be used, provided the frequency is low enough. In FIG. 12 passageways may need to be provided to assure that the fluid ($c_0$) is the same on both sides of member 91. Otherwise the interrogating beam will not emerge in the fluid parallel to the beam incident in the transducer cavity.

Figure 14:
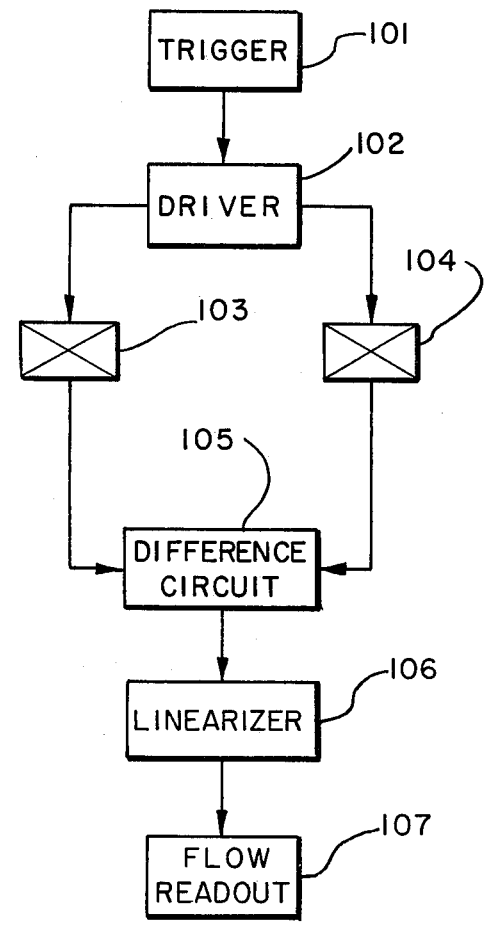
FIG. 14 is an illustration generally in block diagramatic form of circuitry for use in conjunction with the flowmeter cell illustrated.

In FIG. 14 there is illustrated in block diagramatic form circuitry for use with the flow cells described previously. A trigger unit 101 provides at either programmed times or in response to manual initiation, a triggering signal to drive unit 102, which provides actuating signals to transducers 103 and 104 which may be positioned, for example in the arrangement shown in the embodiment of FIG. 1. Transducers 103 and 104 upon excitation from the drive unit 102, emit beams of ultrasonic waves. The ultrasonic beam from the transducer 104 is sensed by transducer 103 and vice versa. The outputs from the transducers 103 and 104 which are signals responsive to received ultrasonic beams are supplied to difference circuit 105 and the output from this circuit representing the difference in the phase of the received signals is provided through linearizer 106 to flow readout indicator 107. The linearizer 106 serves the function of adjusting the output of the difference circuit from various fluids to properly operate the flow readout indicator 107. The difference is transit times between the upstream traveling beam and the downstream traveling beam provides, as discussed earlier, an indication of the flow velocity of the fluid within flow conduit 1. The upstream and downstream beams can be separated either by initiating the beams at different times so that the measurements are essentially made in rapid sequence or, preferably, by simultaneous measurements. The latter may be accomplished by any of several known techniques. One technique using pseudo random noise coding is described in a paper delivered at the IEEE ultrasonics symposium in Boston on Oct. 4–7, 1972 designated paper L6 entitled Ultrasonic Mass Flowmeter, 1972 Ultrasonics Symposium Proceedings, (page 87–90) Catalog No. 72 CHO 708-8SU.

Figure 13:
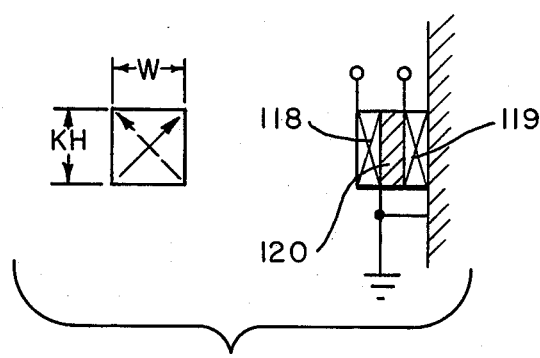
FIG. 13 is an illustration generally in diagramatic form of a transducer arrangement suitable for use in the practice of this invention.

While these methods can be employed using only a single transducer on either end of the measuring path, there are advantages to be obtained if two transducers are used at each end of the path. As illustrated in FIG. 13 a pair of shear wave transducers may be orthogonally polarized with respect to one another, that is ± 45° relative to the plane of incidence. One transducer 118 is the transmitting transducer while the other transducer 119 is the receiver transducer. The transducers 118 and 119 are separated from one another by a layer of solid material 120 having the same characteristic acoustic impedance as the transducers themselves. For example, this intermediate may be formed of unpolarized piezoelectric material. Utilizing a pair of such transducers at either end of the path, in a simultaneous measurement, separation of as much as 40 to 60 dB may be achieved between the signals from the two transducers.

In some situations the small nonuniformity of the intensity of the plane wave in the fluid may be compensated for by "shading" the transducer electrodes. For example, a small portion of the central part of the electrode may be removed so that the corresponding part of the transducer is not activated. This would compensate for a weakened acoustic field at the edges of the beam. Methods have been described recently by G. Kossoff in the Journal Ultrasonics for beam shaping and by others in the acoustics literature.

Having described the invention, various other modifications and improvements will occur to those skilled in this art. The definition of the invention is therefore, included in appended claims.

I claim:

1. A flowmeter cell for ultrasonically measuring the flow velocity of fluids comprising, means for containing the flowing fluid, said means having a flow channel of rectilinear internal cross section with a width dimension W and a height dimension H, said flow channel extending in a first direction normal to the plane of said rectilinear cross section for a distance at least twice the larger one of the dimension W or H;

transducer means external to said flow channel for generating and sensing a beam of ultrasonic waves, said beam having a substantially uniform intensity rectilinear cross section with a width dimension W and height dimension kH where $k \leq 1$, said beam being transmitted into said conduit such that it is propagated through said fluid at an oblique angle with respect to said first direction.

2. A flowmetering cell in accordance with claim 1 and including means for delivering said fluid to be measured to said flow channel to flow therethrough in said first direction.

3. A flowmetering cell in accordance with claim 2 and including means coupled to said transducer means for determining the difference in transmission of the ultrasonic waves along a path having a component in the downstream flow direction of said fluid and along a path having a component in the upstream flow direction of said fluid and providing an output signal indicative of velocity of flow of said fluid.

4. A flowmeter cell in accordance with claim 3 and including a second transducer means generating and transmitting a beam of ultrasonic energy into incidence with an interior wall of said flow channel to provide an output indication of the density of said fluid.

5. A flowmeter cell in accordance with claim 4 and including a third transducer means generating another beam of ultrasonic waves in a direction normal to said first direction to provide an output indication of the velocity of sound within said fluid.

6. A flowmeter cell in accordance with claim 5 and additionally including means for determining the attenuation of ultrasonic waves propagated through said fluid by said transducer means to provide an output indication indicative of the viscosity of said fluid.

7. A flowmeter cell in accordance with claim 1 wherein $k = 1$.

8. A flowmeter cell in accordance with claim 7 where $W = H$.

9. A flowmeter cell in accordance with claim 1 wherein $1 \geq k \geq 0.5$.

10. A flowmeter cell for measuring the flow velocity of fluids comprising, means for containing the flowing fluid having a flow channel of rectilinear internal cross section with a width dimension W and height dimension H, said flow channel extending in a first direction normal to the plane of said rectilinear cross section, a first ultrasonic transducer mounted on one side of and external to said flow channel for emitting a beam of ultrasonic waves into the interior of said flow channel, said beam having a substantially uniform intensity rectilinear cross section with a width dimension W and a height dimension kH where $k \leq 1$, said beam being transmitted into said flow channel such that it propagates through said flow channel at an angle oblique with respect to said first direction, and, a second transducer means mounted on the opposite side of said flow channel and positioned to receive ultrasonic waves propagated across the interior of said flow channel at an angle parallel to the angle of propagation of the beam emitted from said first transducer.

11. A flowmeter cell in accordance with claim 10 wherein the walls of said flow channel on the sides on which said first and second transducers are mounted are formed of a first material and include cavities extending at an angle oblique to said first direction partially through said walls from the exterior towards the interior and wherein said transducers are mounted within said cavities at the interior end thereof, the angles of said cavities being determined by the relative acoustic velocity in said first material and in the fluid to be measured such that ultrasonic waves from said first transducer are refracted at the first material-fluid interface to propagate across said flow channel at an angle with respect to said first direction, which angle lies between 10° and 60°.

12. A flowmeter cell in accordance with claim 10 wherein a pair of opposite sides of said flow channel have side channels extending therethrough from the exterior to the interior of said flow channel, each of said side channels including an insert of a first material extending from the interior orifice of said side channel partially towards the exterior of said means for containing the flowing fluid, and wherein said first and second transducers are each acoustically coupled to the outer surface of said insert in the respective side channel and wherein the angles of said side channels with respect to said first direction are determined with respect to the acoustic velocity in said insert material and the acoustic velocity in the fluid to be measured so that ultrasonic waves from said first transducer are refracted at the fluid-insert material interface at an angle with respect to said first direction between 10° and 60°.

13. A flowmeter cell in accordance with claim 10 wherein the walls of said flow channel on the sides on which said transducers are mounted are formed of a first material and each of said transducers is mounted on a wedge acoustically coupled to the wall of said flow channel, the angle of said wedge being determined with respect to the acoustic velocity in the material of said wedge, the material of said wall and said fluid material such that the emitted ultrasonic beam is refracted at the fluid-flow channel wall interface at an angle with respect to said first direction which is between 10° and 60°.

14. A flowmeter cell in accordance with claim 10 wherein the walls of said flow channel on the side where said transducers are mounted include a straight side channel extending from the exterior to the interior of said means for containing the flowing fluid, said channel having its axis at an angle equal to said oblique angle of incidence of said ultrasonic beam, each of said transducers being mounted within the respective side channels, said first transducer being mounted at an angle to emit said ultrasonic beam in a direction along the axis of said side channel.

15. An ultrasonic flow meter cell in accordance with claim 14 further including a mesh screen mounted across the inner orifice of each of said side channels.

16. A flowmeter cell in accordance with claim 14 further including a membrane mounted at the inner orifice of each of said side channels, said membrane being formed of a material and having a thickness such that it transmits a substantial portion of ultrasonic waves incident thereon, said side channels having openings to permit a portion of the fluids to be measured to pass into said side channels behind said membrane
  a first transducer positioned on said body external to said flow channel to emit a beam of ultrasonic waves toward said flow channel at an angle of substantially 30° with respect to said first direction, said beam having a rectilinear cross sectional area of substantially uniform intensity normal to its direction of propagation, with a width dimension W and a height dimension kH, where $k \leq 1$,
  a second transducer positioned on the same side of said flow channel as said first transducer and positioned to receive said beam of ultrasonic waves emitted from said first transducer and reflected from the wall of said flow channel opposite to the side where said first and second transducers are mounted,
  a section of high density material lining the interior wall of said flow channel in a position to intercept the beam emitted from said first transducer and reflect it toward said second transducer.

17. A flowmeter cell in accordance with claim 10 wherein said first transducer is a rectilinear piezoelectric transducer having a width dimension W and a height dimension kH.

18. A flowmeter cell in accordance with claim 10 wherein said first transducer is a circular piece of piezoelectric material having exciting electrodes attached thereto in a rectilinear configuration to produce therefrom said rectilinear shaped beam.

19. A flowmeter cell in accordance with claim 10 wherein said first transducer is coupled both to a means for exciting said transducer to emit said beam of ultrasonic waves and also to a means for detecting ultrasonic waves received by said transducer and wherein said second transducer is configured to emit a beam of ultrasonic waves having a rectilinear cross section with a width dimension W and a height dimension kH, where $k \leq 1$ and wherein said second transducer is coupled to a means for exciting said second transducer to emit said rectilinear shaped waves and to a means for detecting ultrasonic waves received by said second transducer.

20. A flowmeter cell for ultrasonic measuring the flow velocity of a fluid comprising,
  a first body having a flow channel passing therethrough, said flow channel having a rectilinear internal cross section with a width dimension W and height dimension H, said flow channel extending in a first direction normal to the plane of said cross section a distance greater than twice the larger one of said dimensions W or H, the material forming said body being an organic polymer.

21. A probe for measuring ultrasonically the flow velocity of fluid flowing within a conduit having a generally circular cross section comprising,
  first and second clamps, shaped to clamp over said conduit and to deform said conduit into a rectilinear cross section in a plane normal to the direction of flow of fluid within said conduit, said rectilinear cross section having a width W and a height H,
  first transducer means mounted on said clamp external to said conduit for emitting across said fluid a beam of ultrasonic waves having a substantially uniform intensity rectilinear cross section in a plane normal to the propagation of said waves, said rectilinear cross section having a width dimension W and a height dimension kH where $k \leq 1$;
  said beam of ultrasonic waves being incident upon said fluid at an angle oblique to a normal direction of flow of said fluid, and
  a second transducer positioned on a clamp opposite to said first clamp to receive the beam of ultrasonic waves emitted from said first transducer.

22. A flowmeter cell for ultrasonically measuring the flow velocity of fluid comprising means containing said flowing fluid having a flow channel of rectilinear internal cross section with a width W and a height H, said flow channel extending in a first direction normal to the plane of said cross section a distance at least twice the larger one of the dimensions W or H,
  a first transducer for emitting a beam of ultrasonic waves having a substantially uniform intensity rectilinear cross section of width W and height kH where $k \leq 1$, said beam propagating along said flow channel on an axis which in the fluid forms an oblique angle with said first direction, the internal wall of said flow channel within the area of incidence of said ultrasonic beam emitted from said first transducer being subdivided into a series of v grooves.

\* \* \* \* \*

UNITED STATES PATENT AND TRADEMARK OFFICE
CERTIFICATE OF CORRECTION

PATENT NO. : 3,906,791
DATED : September 23, 1975
INVENTOR(S) : Lawrence C. Lynnworth It is certified that error appears in the above-identified patent and that said Letters Patent are hereby corrected as shown below:

Column 4, line 38 "conductor" should read --conduit--.
Column 8, line 6 "18" should read --$\sim$--; line 23 "it" should read --if--.
Column 11, line 39 "14" should read --12--; line 46 add --.-- [period] at the end of the line; lines 47-65 delete the entirety of these lines.
Column 12, line 29 "." should read --,--; add the following to claim 20 following Column 12, line 29;
--a first transducer positioned on said body external to said flow channel to emit a beam of ultrasonic waves toward said flow channel at an angle of substantially 30° with respect to said first direction, said beam having a rectilinear cross sectional area of substantially uniform intensity normal to its direction of propagation, with a width dimension W and a height dimension kH, where $K \leq 1$,
a second transducer positioned on the same side of said flow channel as said first transducer and positioned to receive said beam of ultrasonic waves emitted from said first transducer and reflected from the wall of said flow channel opposite to the side where said first and second transducers are mounted,
a section of high density material lining the interior wall of said flow channel in a position to intercept the beam emitted from said first transducer and reflect it toward said second transducer.--

Signed and Sealed this seventeenth Day of February 1976

[SEAL]

Attest:

RUTH C. MASON
Attesting Officer

C. MARSHALL DANN
Commissioner of Patents and Trademarks